US010839313B2

(12) United States Patent
Belous

(10) Patent No.: US 10,839,313 B2
(45) Date of Patent: Nov. 17, 2020

(54) IDENTITY PREDICTION FOR UNKNOWN USERS OF AN ONLINE SYSTEM

(71) Applicant: Facebook, Inc., Menlo Park, CA (US)

(72) Inventor: Vladislav Belous, Menlo Park, CA (US)

(73) Assignee: Facebook, Inc., Menlo Park, CA (US)

(*) Notice: Subject to any disclaimer, the term of this patent is extended or adjusted under 35 U.S.C. 154(b) by 745 days.

(21) Appl. No.: 15/402,173

(22) Filed: Jan. 9, 2017

(65) Prior Publication Data

US 2018/0197107 A1 Jul. 12, 2018

(51) Int. Cl.
G06N 20/00 (2019.01)
G06N 5/02 (2006.01)
G06Q 30/06 (2012.01)

(52) U.S. Cl.
CPC ............. G06N 20/00 (2019.01); G06N 5/022 (2013.01); G06Q 30/0601 (2013.01)

(58) Field of Classification Search
CPC ..... G06N 20/00; G06N 5/022; G06Q 30/0601
See application file for complete search history.

(56) References Cited

U.S. PATENT DOCUMENTS

| 8,874,589 B1* | 10/2014 | Liu | G06F 16/9535 |
| | | | 707/749 |
| 9,818,145 B1* | 11/2017 | Finkelstein | G06Q 30/0631 |
| 2010/0250348 A1* | 9/2010 | Dunbar | G06Q 30/02 |
| | | | 705/14.4 |
| 2011/0016204 A1* | 1/2011 | Wiener | H04L 51/36 |
| | | | 709/224 |
| 2011/0191811 A1* | 8/2011 | Rouse | H04N 21/25808 |
| | | | 725/93 |
| 2013/0007830 A1* | 1/2013 | Klappert | H04H 20/30 |
| | | | 725/116 |
| 2013/0239220 A1* | 9/2013 | Gjonej | G06F 21/6245 |
| | | | 726/26 |
| 2013/0304789 A1* | 11/2013 | Herlein | G06Q 30/02 |
| | | | 709/201 |
| 2013/0318077 A1* | 11/2013 | Greenzeiger | G06F 16/29 |
| | | | 707/724 |
| 2014/0244678 A1* | 8/2014 | Zamer | G06F 16/9535 |
| | | | 707/758 |

(Continued)

Primary Examiner — Vincent Gonzales
Assistant Examiner — Imad Kassim
(74) Attorney, Agent, or Firm — Fenwick & West LLP

(57) ABSTRACT

For a visit of a user to a web page where the user's identity on an online system is not presently known to the online system, the online system uses a machine learning model to make a prediction of the user's identity. The online system obtains visit data about the visit of the user to the web page. The online system identifies candidate user IDs that may represent the user, based on the visit data and data known about previous visits of the candidate user IDs. The online system derives visit features for each candidate user ID based on a relationship between the current visit data and previous visit data for the candidate user ID. The online system provides the visit features for each candidate user ID to a prediction model that determines whether, or how likely, the candidate user ID accurately identifies the visiting user, and based on the determinations selects one of the candidate user IDs as the most likely user ID for the visiting user.

18 Claims, 5 Drawing Sheets

(56) References Cited

U.S. PATENT DOCUMENTS

2014/0280890 A1* 9/2014 Yi .................... H04L 67/22
709/224
2015/0066593 A1* 3/2015 Huang ............... G06Q 30/0202
705/7.31

* cited by examiner

IDENTITY PREDICTION FOR UNKNOWN USERS OF AN ONLINE SYSTEM

BACKGROUND

This disclosure relates generally to online systems, and more specifically to predicting the identity of for users of online systems where the identities are presently unknown.

Many online systems rely on knowing the identities of users to be able to take more intelligent user-specific actions, such as providing content that is tailored to the user, or keeping a consistent record of the user's actions as the user navigates the online systems. However, in many instances, a particular user is unknown to an online system at a given time, even though the user has an account on the online system. This could occur, for example, if the user is not currently logged on to the online system via the user's client device. When the online system has the opportunity to provide content to the user, if the user is unknown to the online system, then the online system will lack the ability to provide the content most appropriate for the user. Thus, any content that the online system does provide to the user is less likely to be relevant to the user than if the online system knew the identity of the user, leading the user to be more likely to ignore the content. Similarly, if the user is unknown to the online system at particular times as the user is browsing, then the online system will not be able to maintain a consistent record of the various actions that the user takes over time.

SUMMARY

For a web page visit of a user whose identity on an online system is not presently known to the online system, the online system obtains visit data about the visit (e.g., internet protocol address or machine ID of a user device of the user). For example, a user of the online system, such as a social networking system, may visit a web page in a domain different from the domain of the online system. If the user is visiting the web page while not logged into the online system (e.g., on a device or a browser on which the user is not currently logged into or has never logged into the online system), the online system may be unable to identify the user as a user of the online system or to connect the user to the online system's user profile and/or user ID for the user. Thus, the online system uses a machine learning model to predict the identity of this user. The online system identifies candidate user IDs that may represent the user, based on the visit data, and data known about previous visits of the candidate user IDs. The online system derives visit features for each candidate user ID based on a relationship between the current visit data and previous visit data for the candidate user ID. The online system provides the visit features for each candidate user ID to a prediction model that determines whether, or how likely, the candidate user ID accurately identifies the visiting user. Based on the determinations, the online system selects one of the candidate user IDs as the most likely user ID for the visiting user.

Using the selected user ID, the online system can take various user-specific actions. For example, the online system can provide content that is more relevant for the user, even though the user's identity was not initially known to the online system (e.g., because the user was not expressly logged on to the online system via the user's device). As another example, the online system can keep more complete records that correlate the various actions of the user. For instance, assume that a user is presented with an content item regarding a particular product on the user's smartphone (where the user is logged onto the online system), and then later views the product on the user's desktop computer (where the user is not logged onto the online system) and perhaps also purchases the product. The selection of a user ID based on the user's visit features allows the online system to infer the identity of the user while the user is using the desktop computer and thereby to correlate the viewing of the product and the purchase of the product with the initial presentation of the content item while the user was using the smartphone.

In one embodiment, the online system trains the prediction model using supervised machine learning. For each visit by users whose user IDs are known to the online system (e.g., because the users have expressly logged on to the online system), the online system obtains visit data and identifies a plurality of candidate user IDs based on the visit data. The online system derives visit features for each candidate user ID, the visit features describing a relationship of the visit data and data known about previous visits of the candidate user IDs. Using the fact that the user IDs are known to the online system, the online system determines which candidate user IDs for a visit matched the actual user ID for that visit and accordingly generates a training set using the derived visit features. The online system trains a prediction model by providing the visit features of the training set to a supervised machine learning algorithm.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
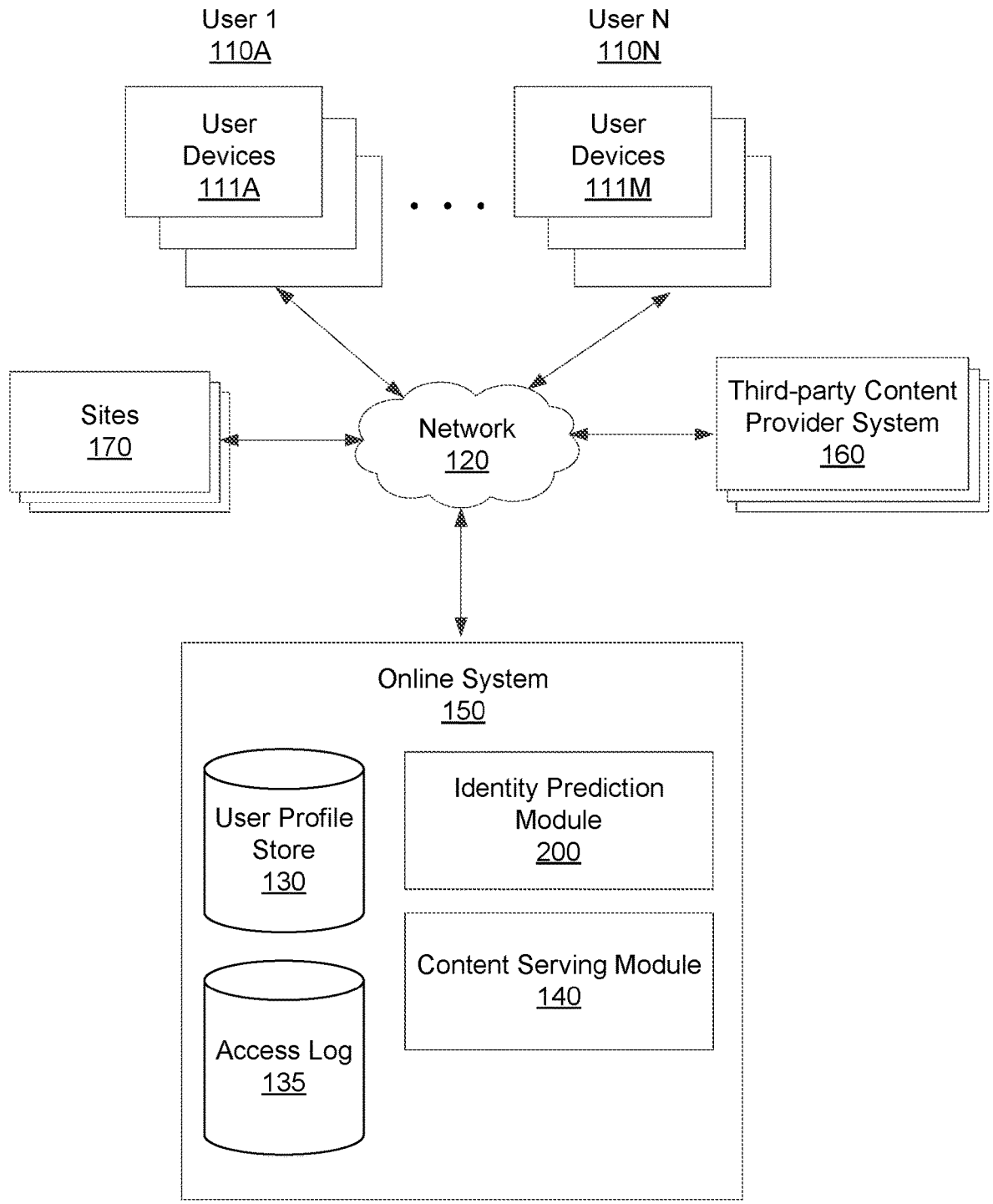
FIG. 1 is a system environment of an online system including an identity prediction module, in accordance with an embodiment.

FIG. 1 is a system environment 100 of an online system including an identity prediction module 200. In the embodiment shown in FIG. 1, the system environment 100 includes one or more users 110 (e.g., 110A through 110N), one or more user devices 111 of the users 110 (e.g., 111A through 111N), an online system 150, sites 170, and third-party content provider systems 160 connected through a network 120. A user 110 may have one device 111, or a plurality of user devices 111. Users 110 use one or more of their user devices 111 to interact with the online system 150 and/or the sites 170, e.g., to view webpages or other content made available by the sites 170. When a user 110 uses a user device 111 of the user to interact with a site 170 that relies on the online system 150 to provide additional user-specific content, it is preferable for the online system 150 to know the identity of the user in order to be able to deliver user-specific content. Accordingly, the online system 150 includes an identity prediction module 200 that predicts identities of the users 110 who are not currently logged into the online system 150 via the user's user device 111, but who do have identities (e.g., accounts) on the online system 150. These various components are now described in more detail.

In some embodiments, access to the online system 150 is made available via a custom application, which may be installed on the user devices 111; alternatively, a web browser application may be used instead of a custom application. A given user 110 may use multiple user devices 111 (e.g., one user device to access the online system 150, and another user device to browse other sites 170), and multiple users may use the same device (e.g., several family members sharing the same device). Although FIG. 1 illustrates only a few users 110, devices 111, sites 170, and third-party content provider systems 160, it should be appreciated that any number of these entities (including millions) may be used within the environment 100 (e.g., there may be millions or billions of users 110 and devices 111). In alternative configurations, different and/or additional entities may also be included in the system environment 100.

The user device 111 is an electronic device capable of receiving user input as well as transmitting and/or receiving data via the network 120. Examples of user devices include a mobile device, a tablet computer, a notebook computer, a desktop computer, a laptop computer, a personal digital assistant (PDA), a gaming device allowing players to play games online and to purchase and download games and various forms of multimedia (e.g., music, movie, audio, or television program), a portable compute, other computing device including computing functionality and data communication capabilities, a streaming device (e.g., APPLE TV®), a networking media player (e.g., ROKU®), or other suitable networking electronic device. In some embodiments, the user device 111 performs functions such as executing software applications, receiving digital content, presenting webpages from websites hosted by web servers on the network 120, downloading files, and the like. In some embodiments, the user device 111 provides a user interface (UI), such as physical and/or on-screen buttons with which a user 110 may interact with the user device 111 to perform functions such as viewing, selecting, and consuming digital content such as digital records, webpages, photos, videos and other content. For example, a user device 111 may execute a browser application to enable interaction between the user device 110 and the online system 150 or the sites 170 via the network 120. In another embodiment, the user device 110 interacts with the online system 150 through an application programming interface (API) running on a native operating system of the user device 110, such as IOS® or ANDROID™.

A user device 111 is uniquely identified by an identifier, e.g., a device identifier (ID) provided by the manufacturer of the use device. Examples of unique identifiers for a user device 111 include a device universally unique identifier (UUID), a machine ID, and a media access control address (MAC address). A user device 111, when activated, broadcasts wired and/or wireless signals, which can be received and analyzed for detection of the presence of the user device 111. Visit data describing a visit of a user of the user device (e.g., a visit to a webpage provided by the online system 150 and/or site 170) can be obtained or derived by the online system 150 for the visit. Examples of visit data include attributes of the user device (e.g., UUID, public IP address, private IP address, MAC address, machine ID, serial number, model number, device name, manufacture information, cookies on the user device, or some combination thereof), data describing relationships between a user and attributes of the user device, or some combination thereof. For example, the signals from a user device 110 using wireless communication protocols, e.g., BLUETOOTH, can include information such as the MAC address of its wireless interface, vendor of the user device 110, or class of device indicating the type of the user device. In some embodiments, the signals from a user device 110 allow the online system 150 to derive visit data for further processing to predict an identity of a user who requests content from the third-party content provider system 160.

The network 120 facilitates communications among one or more user devices 111, the online system 150, the sites 170, and/or one or more third-party content provider system 160. For example, a site 170 provides data such as webpages or media content to the user device 111 via a public IP address assigned to the user device 111. The user device 111 passes data such as visit data to the online system 150 via the network 120. In response to a request of webpages provided by sites 170 to users 110, the online system 150 provides additional content to the user device based on visit data provided by the user device 111.

The network 120 may be any wired or wireless local area network (LAN) and/or wide area network (WAN), such as an intranet, an extranet, or the Internet. In various embodiments, the network 120 uses standard communication technologies and/or protocols. Examples of technologies used by the network 120 include Ethernet, 802.11, 3G, 4G, 802.16, or any other suitable communication technology. The network 120 may use wireless, wired, or a combination of wireless and wired communication technologies. Examples of protocols used by the network 120 include transmission control protocol/Internet protocol (TCP/IP), hypertext transport protocol (HTTP), simple mail transfer protocol (SMTP), file transfer protocol (TCP), or any other suitable communication protocol.

The third-party content provider system 160 provides content to the online system 150 for potential providing to user devices 111 when users 110 are visiting sites 170. Examples of such content include advertisements, stories, images, and videos. The third-party content provider system 160 may additionally provide information associated with the content that describes the context in which the online system 150 should provide the content to user devices, such as properties of users to whom to provide the content (e.g., age, gender, or particular interests), or properties of webpages of the sites 170 that the users are viewing (e.g., the topic(s) of the pages).

The site 170 provides data such as webpages or media data the user device 111. For example, the site 170 provides a webpage including code specifying a content request to the user device 111 (e.g., an HTTP "IMG" tag specifying a particular image representing the ad). When a user views the webpage via the user device 111, the code included in the webpage causes the user device 111 to send the content request to the online system 150. The online system 150 then selects appropriate content received from the third-party content provider system 160 based on the known contextual information about the visit (e.g., data about the user, where an identity of the user is known or predicted, or data about the webpage provided by the site 170).

In one embodiment, the sites 170 use a tracking pixel or piece of code placed on web pages of the sites to monitor users visiting the sites that have not opted out of tracking. The tracking pixel is a segment of HTML code added to the sites 170. A tracking pixel might be included on various pages, including on a product page describing a product, on a shopping cart page that the user visits upon putting something into a shopping cart, on a checkout page that the user visits to checkout and purchase a product, etc. For example, a tracking pixel is a transparent 1×1 image, an iframe, or other suitable object. When a user's browser loads a page having the tracking pixel, the tracking pixel results in the user's browser attempting to retrieve the content for that pixel. Specifically, the browser contacts the online system 150 to retrieve the content. The request sent to the online system 150, however, actually includes various data about the user's actions taken on the site 170. The site 170 can control what data is sent to the online system 150. For example, the site 170 may include information about the page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In some embodiments, a cookie set by the online system 150 can also be retrieved by the online system, which can include various data about the user, such as the online systems' UID for the user, information about the client device 111 and the browser, such as the Internet Protocol (IP) address of the client device, among other data.

The online system 150 can then use this data received about the user to serve better content to the user in the future (e.g., since the online system has further data about products purchased or browsed that might be of interest), and can also use this in retargeting of that product to the user (e.g., where the user went to the product page on the site 170 by clicking on an of the third party presented to the user in the online system). The online system 150 can also use this data in conversion tracking and reporting results of advertising campaigns to the site 170. For example, if the owner of the site 170 has spent money at the online system 150 to have the online system serve ads for its products, and a particular user views an ad on the online system and then purchases the product advertised (possibly at some point later, and possibly on a different device), the online system can link the purchase/conversion to the ad originally shown on the online system. Thus, the online system 150 can include this data in its reporting to the site 170 of how many conversions the ad campaign received.

The online system 150 provides additional content to be included in the webpage from site 170 to the user device 111 based at least in part on information known about the user 110. If the user's identity is not known, the online system 150 predicts the user's identity using visit data provided by the user device 111. In the embodiment shown in FIG. 1, the online system 150 includes an identity prediction module 200, a content serving module 140, a user profile store 130, and an access log 135. In alternative configurations, less, different and/or additional entities may also be included in the online system 150. In some embodiments, the online system 150 also includes a content store storing various types of content items received by the online system 150 from the third-party content provider system 160, a user interface manager configuring user interfaces for presentation to users via a software application module, a web server linking the online system 150 via the network 120 to the user devices, or other suitable module processing information received from the user device 111 and/or the content provider system 160. In some embodiments, the user profile store 130, the access log 135, and the content serving module 140 are part of the identity prediction module 200.

The identity prediction module 200 predicts the identity of an unknown user based on the user's visit data and links the user's identity to a corresponding user profile stored in the user profile store 130. An unknown user is a user having an account on the online system 150 and who has previously been identified by the online system (e.g., through the user having expressly logged into the online system), but is not currently logged onto the online system 150. In some embodiments, the identity prediction module 200 predicts a user identity based on a prediction model. The prediction model describes relationships between features of a user's visit data and a user identity. Visit features describe relationships between a user and the user's visit data. The prediction model may generate a likelihood indicating how likely that user identification (ID) is a correct user ID for the user based on the user's visit features. Further details are provided with respect to FIG. 2.

The content serving module 140 receives content items from the various third-party content provider systems 160 for provision to users to whom the content would be relevant and delivers appropriate content items to users. For example, when the online system 150 obtains visit features from an unknown user (e.g., a visit to a site 170), the identity prediction module 200 predicts an identity of the user. The user's identity links the user's ID with a user profile in the online system 150. The online system 150 may deliver content to the user based on the user's interest data obtained from the user profile. In some embodiments, the online system 150 receives a set of content items from the third-party content provider system 160, e.g., five images showing a pair of running shoes, and dynamically creates the content to deliver to the user upon receiving a request for presentation of the content based on corresponding user profile of the user.

The access log 135 receives communications from a web server about user actions within and/or external to the online system 150 for users whose identities are known (e.g., based on their logins to the online system 150). The online system 150 populates the access log 135 with information about user actions. When a user performs an action using the online system 150, the online system adds an entry for that action to the access log 135. Any action that a particular user takes with respect to another user is associated with each user's profile, through information maintained in a database or other data repository, such as the access log 135. Such actions may include, for example, visits to various web pages, viewing content, attending an event posted by another user, posting a comment, "liking" a content item, among others.

The access log 135 may also contain information about browsing actions of the user on systems such as the sites 170. For example, if a particular user views a page or other content containing an advertisement for a particular product, then proceeds to click the advertisement and ultimately to purchase the product, the access log 135 might contain entries reflecting each of these actions (e.g., that the user browsed a page with a particular URL; was served an ad with a particular ID and corresponding to a particular product; clicked on the ad; and purchased the product). The accurate tracking of these actions allows the correlation of ad impressions with ad selections and purchases/conversions, which in turn allows the computation of more accurate advertising statistics. However, the tracking of the actions is made more difficult when the user's identity is unknown at the time of some of the actions (e.g., because the user is not logged into the online system at the moment). The use of the identity prediction module 200 (described in more detail with respect to FIG. 2) permits the tracking of user actions even when a user's identity is not known (i.e., has not been explicitly specified) at the time of the actions.

User profile store 130 stores user accounts and/or user profiles describing the users of the online system 150. A user profile of a user is associated with a user account and includes information describing the corresponding user, but not restricted to, biography, demography, and descriptive information, such as gender, hobbies, location, work experience, educational history, and the like. The user profile of a user may include information provided by the user, for example, address, ethnicity, age, interests, and so on. The user profile of a user may also include connections of the user (e.g., friendship type relationships, follower type relationships, etc.) with other users of the online system 150.

Using information in the user profiles, connections between users, and any other suitable information, the online system 150 maintains a social graph of nodes interconnected by edges. Each node in the social graph represents an object associated with the online system 150 that may act on and/or be acted upon by another object associated with the online system 150. An edge between two nodes in the social graph represents a particular kind of connection between the two nodes. An edge between a node representing a user and a node representing an object or concept may indicate that that has shown interest in the object or concept. For example, the user profile for a user node may be associated with edges that define that user's prior activity that includes, but is not limited to, visits to various web pages, searches for web pages, commenting and sharing web pages, liking content items, commenting on content items, sharing content items, joining groups, attending events, checking-in to locations, and buying products advertised by advertisements presented to the user.

In one embodiment, the online system 150 may use edges to generate stories describing actions performed by users, which are communicated to one or more additional users connected to the users through the online system 150. For example, the online system 150 may present a story to an additional user about a first user (e.g. a friend) that has liked a new game or application advertised by a sponsored content item presented to the first user. The additional user may choose to interact with the presented story thereby creating an edge in the social graph maintained by the online system 150 between the additional user and the subject matter of the story. The online system 150 may store this edge in an edge store (not shown). This edge may be retrieved from the edge store at a future time point when the online system 150 seeks to identify components that may align well with the additional user's preferences.

In various embodiments, in addition to receiving one or more content items from the third-party content provider system 160, the online system 150 may also receive one or more requests for publishing sponsored content provided by the third-party content provider system 160 to a target user. In various embodiments, the request includes a landing page specifying a network address to which a target user is directed when the sponsored content is accessed. The request from the third-party content provider system 160 also includes a bid amount associated with the sponsored content. The bid amount is used to determine an expected value, such as monetary compensation, provided by the third-party content provider system 160 to the online system 150 if the sponsored content is presented to the target user, or receives a user interaction, or based on any other suitable condition. The online system 150 presents the requested sponsored content on or through a user device 111 associated with the target user.

Identity Prediction Module

Figure 2:
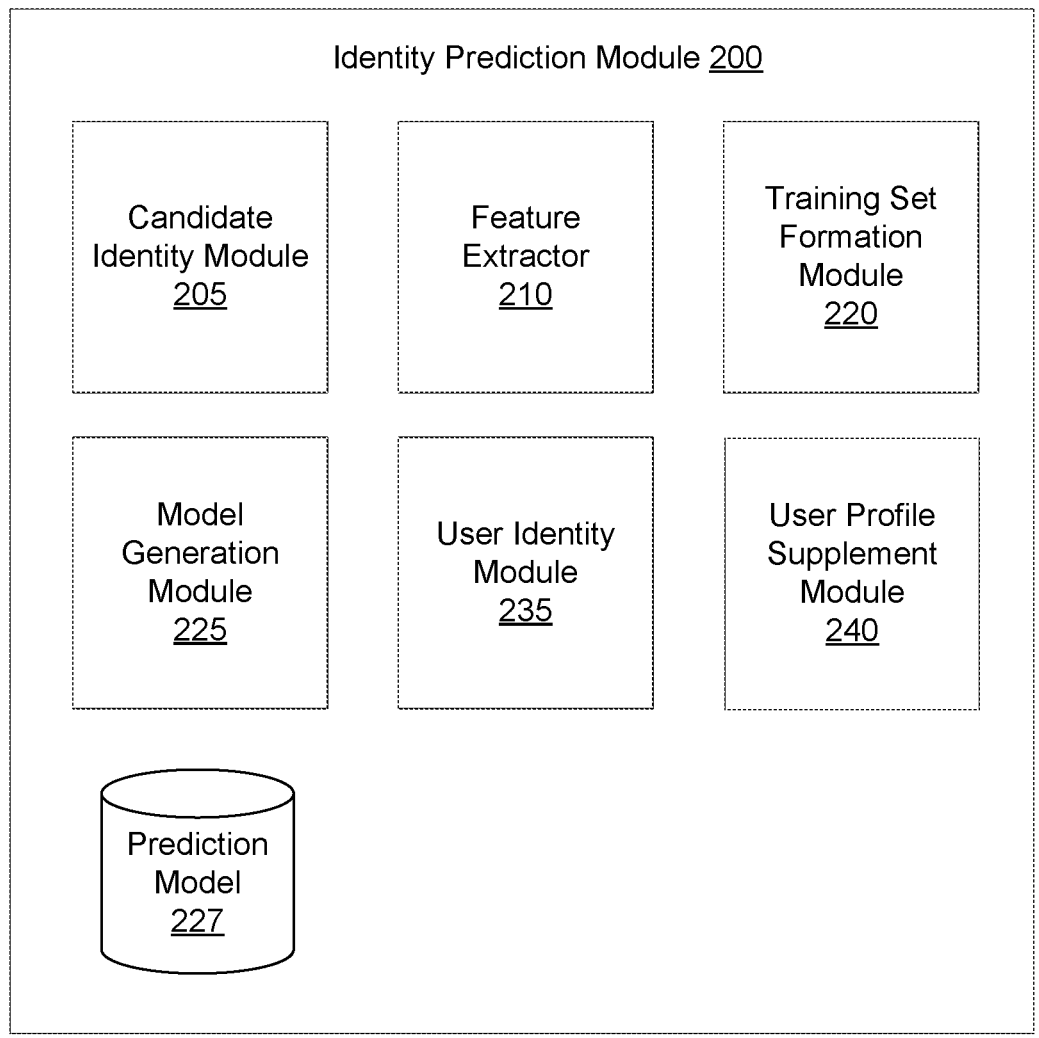
FIG. 2 is a block diagram of an identity prediction module of an online system, in accordance with an embodiment.

FIG. 2 is a block diagram of an identity prediction module 200 of the online system 150, in accordance with an embodiment. In the embodiment shown in FIG. 2, the identity prediction module 200 includes a candidate identity module 205, a feature extractor 210, a training set formation module 220, a model generation module 225, a user identifier 235, a mapping module 240, and a prediction model store 227. In alternative configurations, fewer, different, and/or additional entities may also be included in the identity prediction module 200.

The candidate identity module 205 identifies a plurality of candidate user IDs in response to a visit of a user 110 using one of the user's devices 111, e.g., a visit to content in a webpage provided by the online system 150, or by a site 170. The candidate user IDs are user IDs of the online system 105 and are associated with the user's visit. The candidate user IDs are identified based on visit data. For example, based on IP address of the user device that is used by the user, the candidate identity module 205 could identify a plurality of user IDs that the access log 135 indicates are associated with that IP address (e.g., were used to login from that IP address within some give prior time period, such as the last year).

The feature extractor 210 derives visit features for each candidate user ID obtained from the candidate identity module 205. In some embodiments, the feature extractor 210 derives features corresponding to the relationships between the candidate user IDs and the visit data. A feature describes relationships between a candidate user ID and the visit data. Examples of features for a candidate user include a count of times that the candidate user has visited using a user device 111 having the same attribute value as that of the visit data (e.g., same IP address attribute, or device name attribute), a frequency at which the candidate user has visited using the user device 111 having the same attribute value as that of the visit data, relative to visits of the candidate user having different values of that same attribute (e.g., the candidate user has had the IP address of the visit data in 37% of prior visits), a list of times (e.g., timestamps) that the visit data for the user includes a particular value of the attribute (e.g., a particular IP address), or some combination thereof. Examples of candidate user information associated with attributes of the user device includes demographic properties of a candidate user with attributes of the user device, biographic properties (e.g., interest information) of a candidate user with attributes of the user device, or some combination thereof.

The training set formation module 220 generates a positive set and a negative set based on visit features extracted by the feature extractor 210 for each candidate user ID. The training set is generated based on visits of users where an identity of the user is known ("known visits"), such as visits for which the user logged into the online system 150 by explicitly specifying a user ID by providing username and password or other credentials. The positive set includes visit features of candidate user IDs for which the candidate user ID did in fact match the user ID explicitly specified during login (e.g., the prediction). The negative set includes features of visits of candidate user IDs for which the candidate user ID did not match the user ID explicitly specified during login.

For example, assume that a user is currently logged on to the online system 150. Based on the visit of the user, the candidate identity module 205 identifies a plurality of candidate user IDs, including a user ID of the user. Because the user is currently logged on to the online system 150, the candidate identity module 205 identifies one of the plurality of candidate user IDs as the actual user ID of the user (also referred to as the true user ID) and remaining candidate user IDs (also referred to as false user IDs) of the plurality of candidate user IDs as not being the actual user ID of the user. The feature extractor 210 derives features of the visit of the various (both true and false) candidate user IDs. The training set formation module 220 generates a positive set using the features of the true user IDs over a plurality of user visits, and a negative set using features of false user IDs over a plurality of user visits.

The model generation module 225 trains a prediction model 227 using the training set from the training set formation module 220. The prediction model 227 describes a relationship between a candidate user ID and visit features of a user visit, and outputs an indication of whether the candidate user ID is the actual user ID of the user of the current visit. In some embodiments, the model generation module 225 trains the prediction model 227 using the training set by weighting the various features, such that features that are more relevant to a user's visit tend to have higher weight than features that are less relevant to the user's visit. For example, assume that a first feature indicates a number of times that the candidate user ID has used the IP address of the visit, and that a second feature indicates a number of times that the candidate user ID has used a device with the device name of the visit, and that the first feature is more predictive than the second feature of user identity. In this case, the prediction model 227 may assign a higher weight to the first feature than the second feature, indicating that it is more predictive of the actual user ID than the second feature. In some embodiments, the model generation module 225 trains a prediction model using multiple training sets. For example, the model generation module 225 trains the prediction model using a training set A corresponding to a target user A, and using a training set B corresponding to a different target user B. The trained prediction model is used to predict whether a candidate user ID is the actual user ID for an unknown user, as further described below.

In some embodiments, the model generation module 225 trains a prediction model 227 based one or more training algorithms. Examples of training algorithms include, but are not limited to, gradient boosted decision trees (GBDT), SVM (support vector machine), neural networks, logistic regression, naïve Bayes, memory-based learning, random forests, decision trees, bagged trees, boosted trees, or boosted stumps.

The user identity module 235 selects a candidate user ID as the actual user ID based in part on a prediction model 227 generated by the model generation module 225. The prediction model 227 generates, for a candidate user ID, a likelihood score indicating how likely the candidate user ID is the true user ID. For example, for an unknown user and a set of candidate user IDs for that unknown user, the feature extractor 210 derives features for each candidate user ID. The user identity module 235 also retrieves the prediction model 227 previously generated by the model generation module 225. The user identity module 235 applies the features of each candidate user ID to the prediction model and scores each candidate user ID based on corresponding features to predict how likely that candidate user ID is the actual user ID. The user identification module 235 and selects a candidate user ID as the actual user ID based on the prediction scores (e.g., selecting the candidate user ID with the highest score).

The user profile supplement module 240 adds information associated with the candidate user ID selected for the visiting user to the user profile of that user ID, so as to capture additional information about the behavior of the visiting user even when the visiting user did not explicitly specify the visiting user's identity and thus was unknown. Examples of added information include interactions between the selected candidate user ID and content provided by different third-party content provider systems 160, and features of the selected candidate user ID. Examples of interactions between the selected candidate user ID and content include viewing content, posting a comment on content, "liking" content, sharing content, purchasing content, frequency and time of the selected candidate user ID performing above actions, or some combination thereof. In some embodiments, to reflect that the information is from the selected candidate user ID (a prediction), rather than an ID explicitly specified by the user, the user profile supplement module 240 may include a numerical confidence weight for the information that indicates a degree of confidence (e.g., a real number such as 0.9, or 0.75) that the selected candidate user ID accurately identifies the unknown user.

Figure 3A:
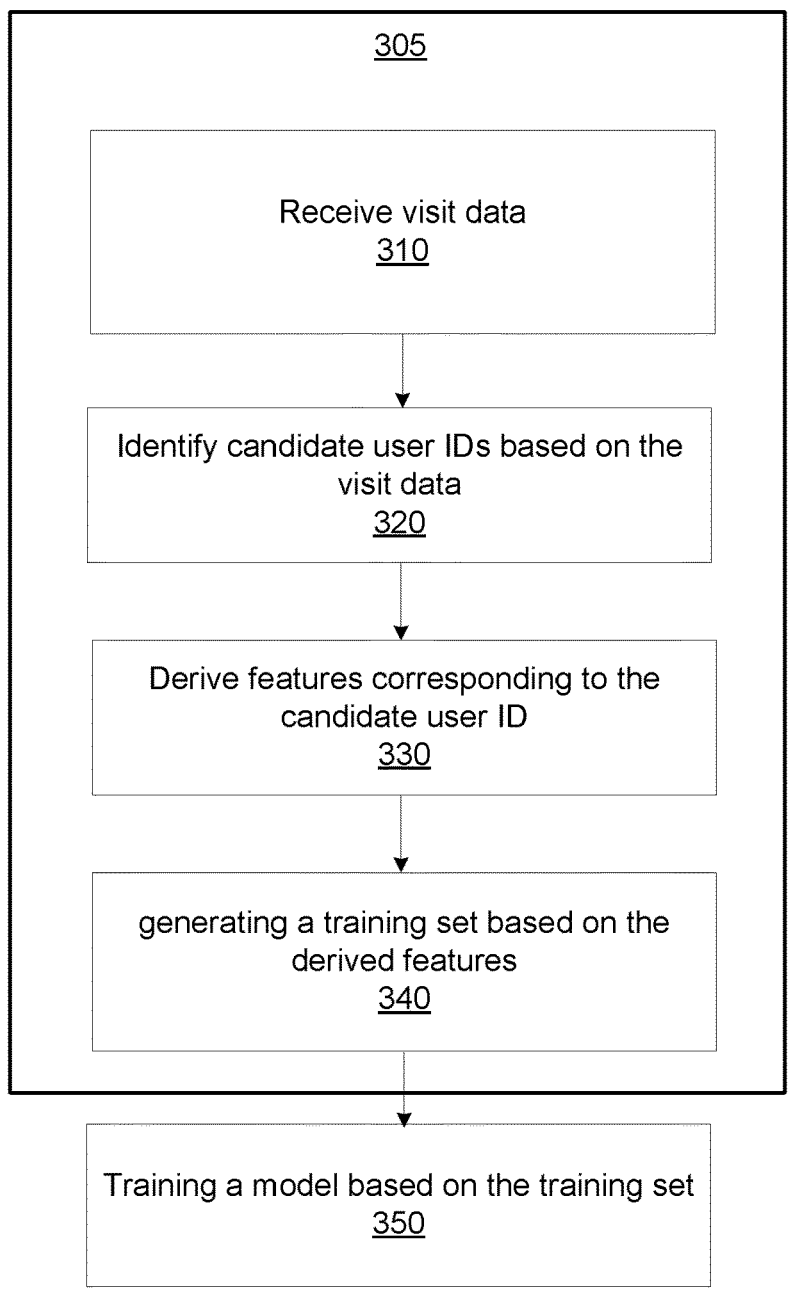
FIG. 3A is a flowchart illustrating a process for training a prediction model to predict an identity of a user, in accordance with an embodiment.

FIG. 3A is a flowchart illustrating a process 300A for training a prediction model 227 to predict an identity of a user, in accordance with an embodiment. The process 300A may include different or additional steps than those described in conjunction with FIG. 3A in some embodiments or perform steps in different orders than the order described in conjunction with FIG. 3A.

The online system 150 receives 310, from a user device 111, visit data describing a visit (e.g., to a webpage) of a known user of the user device. Examples of visit data include attributes of the user device, data describing relationships between one or more users and attributes of the user device, or some combination thereof. The known user is currently logged onto the online system 150; the login process makes the user known due to the explicit submission of user credentials that identify the user.

The online system 150 identifies 320 a plurality of candidate user IDs based on the visit data. For example, in one embodiment, based on attributes (e.g., IP address, device ID, etc.) of the user device 111 of the known user, the identification prediction module 200 of the online system 150 identifies a plurality of candidate user IDs that had been verified via the access log 135 to have logged in over some time period (e.g., last year) using the same user device 111 (e.g., same device ID).

The online system 150 derives 330 features corresponding to the candidate user ID. For example, the identification predication module 200 of the online system 150 derives features corresponding to the relationships between the candidate user IDs and the visit data, as described above with respect to the feature extractor 210 of FIG. 2.

The online system 150 generates 340 a training set based on the derived features. For example, the identification prediction module 200 of the online system 150 generates a positive set and a negative set based on the derived features, with the known user IDs being used to determine which candidate IDs have their features placed in the positive set and which in the negative set. Steps 310 to 340 can be repeated 305 for different known users to obtain a sufficiently large training set. The online system 150 trains 350 the prediction model 227 based on the training set, as described above in FIG. 2.

Figure 3B:
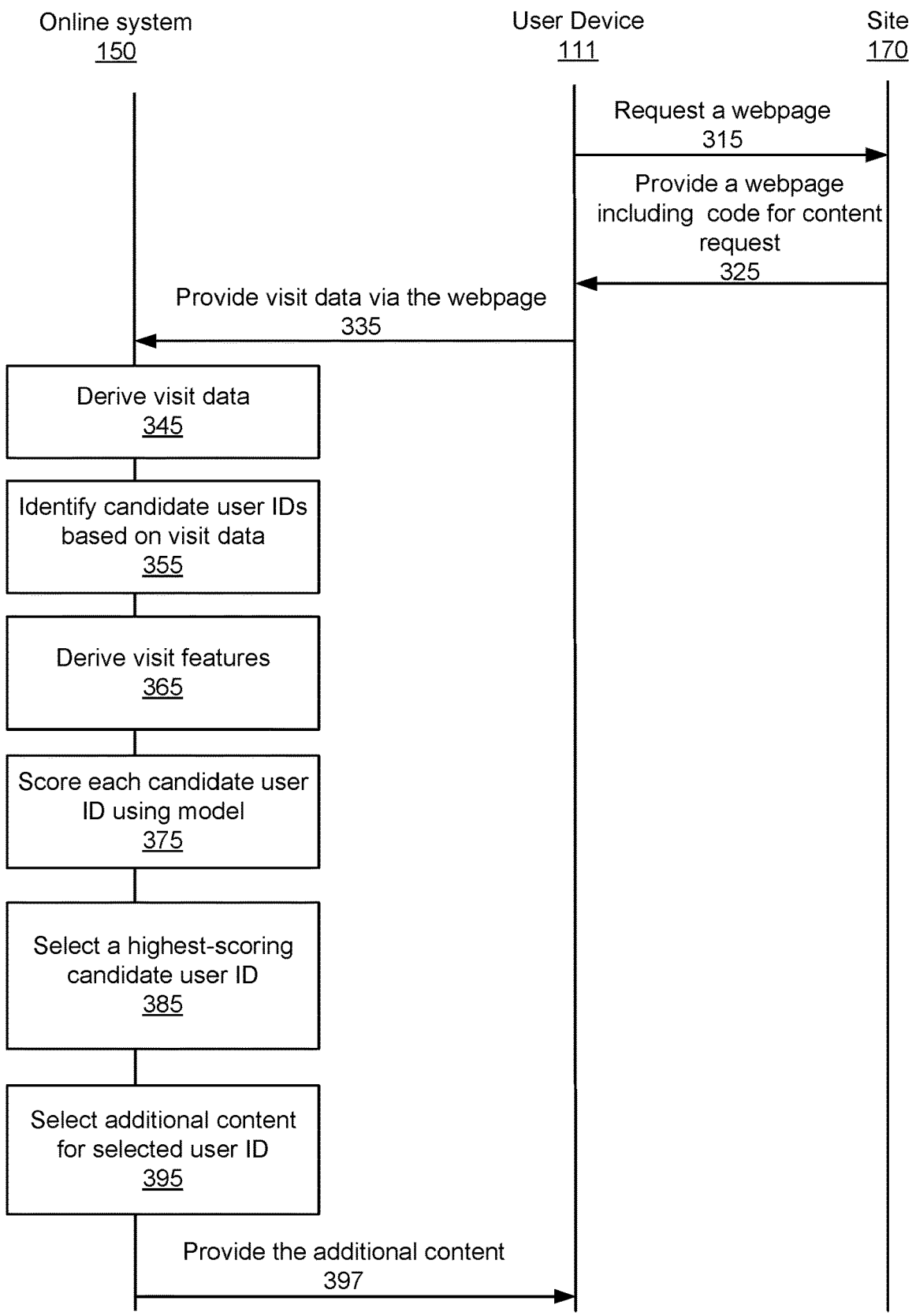
FIG. 3B is an interaction diagram illustrating interactions among an online system, a user device, and a content provider system for providing content to a user using a prediction model to predict an identity of the user, in accordance with an embodiment.

Example Applications of Identifying a User Who does not Log onto an Online System FIG. 3B is an interaction diagram illustrating interactions among an online system 150, a user device 111, and a site 170 for providing relevant content to a user using a trained prediction model to predict an identity of the user, in accordance with an embodiment. In some embodiments the process 300B may include different or additional steps than those described in conjunction with FIG. 3B or perform steps in different orders than the order described in conjunction with FIG. 3B.

A user device 111 requests 315 a webpage from a site 170, e.g., to view a particular webpage of the site 170. The site 170 provides 325 to the user device 111 a webpage that includes a tracking pixel or other code that causes the user device 111 to send a content request to the online system 150. The user device 111 provides 335 visit data via the webpage. The online system 150 obtains, based the request, visit data (e.g., IP address). In some embodiments, the online system 150 derives 345 some of the visit data, rather than obtaining it directly at step 335. For example, in some embodiments the online system 150 derives a unique machine identifier for the user device 111. The online system 150 identifies 355 candidate user IDs based on the visit data, as described above with respect to the candidate identification module 205 in FIG. 2. The online system 150 derives 365 visit features based on the visit data, the visit features reflecting a relationship between the visit data and the user identities (i.e., the candidate user IDs). The online system 150 scores 375 each candidate user ID using the trained prediction model 227. For example, the identification module 200 of the online system 150 uses the prediction model 227 to score each candidate user ID based on its corresponding extracted visit features to predict how likely it is that the candidate user ID is the actual user ID for the user. The online system 150 selects 385 a highest-scoring candidate user ID as the actual user ID for the user of the user device 111. In some embodiments, the online system 150 compares the highest score with a threshold. If the highest score is equal to or above the threshold, the online system 150 selects the highest-scoring candidate user ID as the actual user ID for the user of the user device 111. If the highest score is below the threshold, the online system 150 does not select the highest-scoring candidate user ID as the actual user ID for the user of the user device 111, i.e., the online system 150 will not make an assumption about the user's identity. The online system 150 selects 395 additional content for the selected candidate user ID and provides 397 the additional content to the user device 111. For example, the online system 150 selects additional content based on the updated user profile, as described above with respect to the content serving module 140 in FIG. 1. In some embodiments, the user profile for the selected candidate user ID is supplemented based on behavior of the user, as discussed above with respect to the user profile supplement module 240.

Figure 3C:
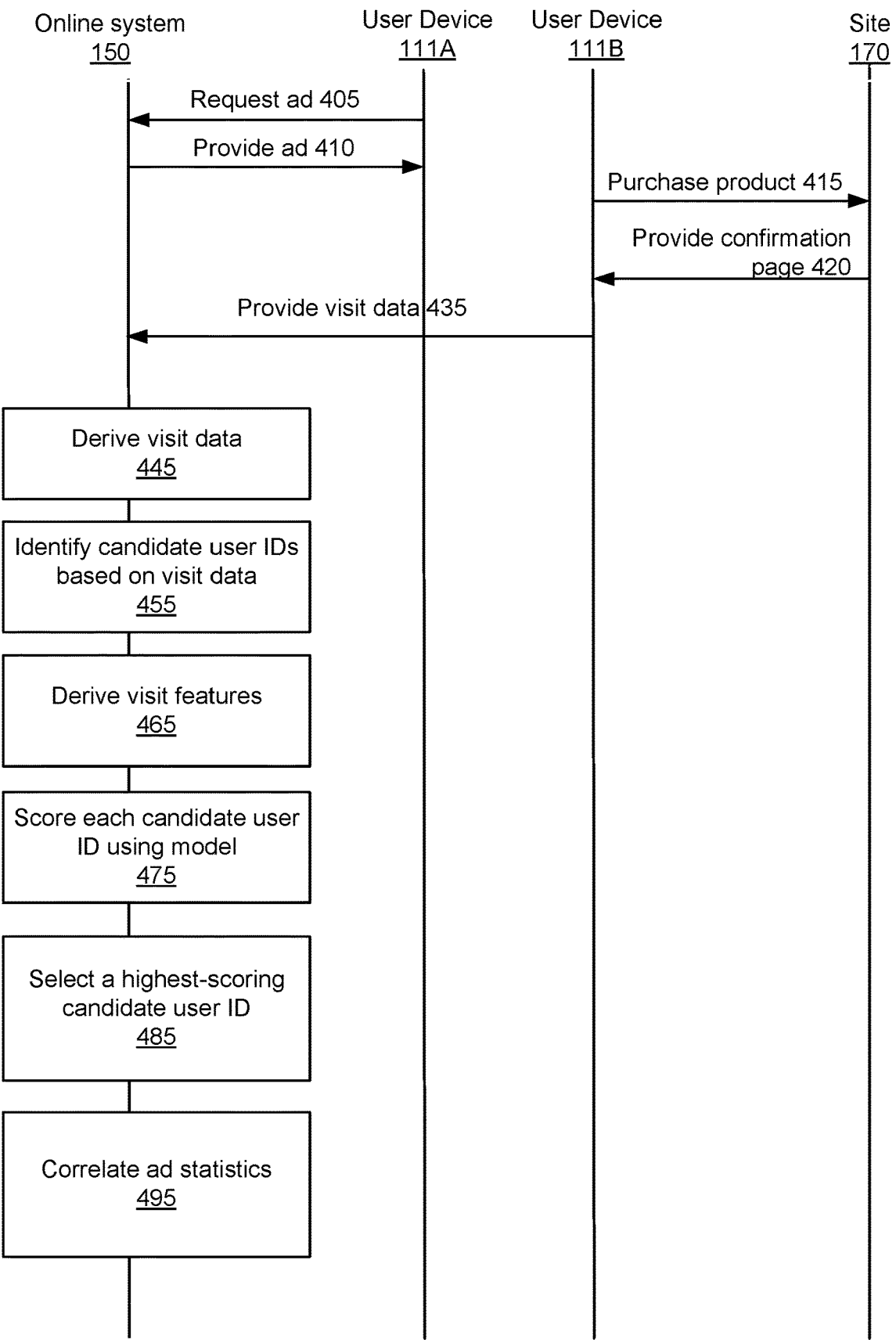
FIG. 3C is an interaction diagram illustrating interactions among an online system, user devices, and a site when correlating actions of the user, in accordance with an embodiment.

FIG. 3C is an interaction diagram illustrating interactions among an online system 150, user devices 111, and a site 170 when correlating actions of the user, in accordance with an embodiment. In some embodiments the process of FIG. 3C may include different or additional steps than those described in conjunction with FIG. 3C or perform steps in different orders than the order described in conjunction with FIG. 3C.

A first user device 111A of the user requests 405 an advertisement, e.g., in response to the user browsing a page of the site 170 that contains a request for the online system 150 to provide a suitable advertisement. In the example of FIG. 3C, the user is presently logged into the online system 150 on the user device 111A, and so as part of the request 405 the user device 111A includes a cookie that indicates a user ID of the user on the online system. Using the user ID in the cookie, the online system 150 identifies the user and provides 410 an ad that is appropriate for the user, using information known about the user on the online system. The online system 150 records in the access log 135 that the user was provided 410 with that particular ad.

Later, using another user device 111B on which the user is not logged onto the online system 150, the user purchases 415 a product referred to in the provided ad on a site 170. The site 170 provides 420 a page confirming the purchase. The page includes a tracking pixel or other code that causes the user device 111B to provide 435 visit data corresponding to the visit of the confirmation page and a confirmation of purchase of the product.

However, since the user is not logged into the online system 150 on the user device 111B, the data provided in step 435 does not include a user ID for the user (e.g., in a cookie). Accordingly, in steps 435-485 the online system 150 uses the visit data to select a highest-scoring candidate user ID as its prediction of the user's identity, in a manner similar to that of steps 335-385 of FIG. 3B.

With the selected candidate user ID, the online system 150 correlates 495 the ad statistics for the user. For example, a user might use multiple different devices to view an advertisement and to later purchase a product related to the advertisement, and the user may be unknown to the online system 150 on some or all of these devices (e.g., due to not being logged into the online system 150 on those devices). However, the online system 150 can use the selected candidate user ID (which for this example is presumed to correctly match the actual user ID included at step 410) for devices on which the user would otherwise be unknown to link the provided advertisement to the product purchase 415 and to accordingly update the conversion rate statistics for the advertisement. This results in more accurate statistics and ultimately more effective advertisements.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method performed by an online system, the method comprising:
    obtaining visit data describing a visit of an unknown user of a user device to a webpage, the unknown user having an account on the online system but not currently logged onto the online system, wherein the visit data comprises at least one of a universally unique identifier (UUID), media access control (MAC) address, or serial number of the user device;
    identifying a plurality of candidate user identifiers (IDs) for the unknown user based on the visit data;
    for each candidate user ID, deriving visit features based on the candidate user ID and the visit data;
    generating a training set based on the derived visit features of the plurality of candidate user IDs, the training set comprising a positive set comprising visit features of candidate user IDs that matched user IDs explicitly specified by users during login;
    training a prediction model based on the training set using supervised machine learning, the prediction model configured to receive as an input, for each candidate user ID, the visit features and output a likelihood score indicating how likely the selected candidate user ID is an actual user ID of the unknown user;
    scoring each candidate user ID using the prediction model;
    selecting a candidate user ID for the unknown user based on the scoring;
    retrieving a user profile associated with the selected candidate user ID;
    selecting additional content based on the user profile; and providing the additional content to the user device.

2. The computer-implemented method of claim 1, wherein the visit data further comprises at least one of a public IP address, private IP address, model number, device name, manufacturer information, or cookies on the user device.

3. The computer-implemented method of claim 1, wherein the candidate user IDs are user IDs of the online system.

4. The computer-implemented method of claim 1, wherein the derived visit features for a candidate user ID of a candidate user comprise at least one of: for an attribute, a count of times that the candidate user has visited using a user device having a same value of the attribute value as that of the visit data, a frequency at which the candidate user has visited using the user device having a same value of the attribute as that of the visit data relative to visits of the candidate user having different values of the attribute, and a list of times that the visit data for the user includes a given value of the attribute.

5. The computer-implemented method of claim 1, wherein the prediction model generates a likelihood score indicating how likely the selected candidate user ID is an actual user ID of the unknown user.

6. The computer-implemented method of claim 1, further comprising:
    adding information associated with the selected candidate user ID to a user profile corresponding to the selected candidate user ID, wherein the added information comprises at least one of: the derived visit features, and interactions between the selected candidate user ID and the selected additional content.

7. The computer-implemented method of claim 6, wherein the added information further comprises a numerical confidence weight indicating a degree of confidence that the selected candidate user ID accurately identifies the unknown user.

8. A non-transitory computer-readable medium comprising computer program instructions that when executed by a computer processor of an online system causes the processor to perform steps comprising:
    obtaining visit data describing a visit of an unknown user of a user device to a webpage, the unknown user having an account on the online system but not currently logged onto the online system, wherein the visit data comprises at least one of a universally unique identifier (UUID), media access control (MAC) address, or serial number of the user device;
    identifying a plurality of candidate user identifiers (IDs) for the unknown user based on the visit data;
    for each candidate user ID, deriving visit features based on the candidate user ID and the visit data;
    generating a training set based on the derived visit features of the plurality of candidate user IDs, the training set comprising a positive set comprising visit features of candidate user IDs that matched user IDs explicitly specified by users during login;
    training a prediction model based on the training set using supervised machine learning, the prediction model configured to receive as an input, for each candidate user ID, the visit features and output a likelihood score indicating how likely the selected candidate user ID is an actual user ID of the unknown user;
    scoring each candidate user ID using the prediction model;

selecting a candidate user ID for the unknown user based on the scoring;

retrieving a user profile associated with the selected candidate user ID;

selecting additional content based on the user profile; and providing the additional content to the user device.

9. The non-transitory computer-readable medium of claim 8, wherein the visit data further comprises at least one of a public IP address, private IP address, model number, device name, manufacturer information, or cookies on the user device.

10. The non-transitory computer-readable medium of claim 8, wherein the candidate user IDs are user IDs of the online system.

11. The non-transitory computer-readable medium of claim 8, wherein the derived visit features for a candidate user ID of a candidate user comprise at least one of: for an attribute, a count of times that the candidate user has visited using a user device having a same value of the attribute value as that of the visit data, a frequency at which the candidate user has visited using the user device having a same value of the attribute as that of the visit data relative to visits of the candidate user having different values of the attribute, and a list of times that the visit data for the user includes a given value of the attribute.

12. The non-transitory computer-readable medium of claim 8, wherein the prediction model generates a likelihood score indicating how likely the selected candidate user ID is an actual user ID of the unknown user.

13. The non-transitory computer-readable medium of claim 8, the steps further comprising:

adding information associated with the selected candidate user ID to a user profile corresponding to the selected candidate user ID, wherein the added information comprises at least one of: the derived visit features, and interactions between the selected candidate user ID and the selected additional content.

14. The non-transitory computer-readable medium of claim 13, wherein the added information further comprises a numerical confidence weight indicating a degree of confidence that the selected candidate user ID accurately identifies the unknown user.

15. A computer-implemented method performed by an online system, the method comprising:

receiving, by an online system from user devices, visit data describing visits to webpages by users of the online system using the user devices, wherein the visit data comprises at least one of a universally unique identifier (UUID), media access control (MAC) address, or serial number of the user device;

identifying user IDs of the users based on the users of the online system being currently logged into the online system;

identifying, for each visit to a webpage, a plurality of candidate user IDs for the user based on the visit data;

for each of the candidate user IDs, deriving visit features based on the candidate user ID and the visit data;

generating a training set based on the derived features, the training set comprising a positive set comprising visit features of candidate user IDs that matched user IDs explicitly specified by users during login of the users to the online system; and training, based on the training set, a prediction model to predict user IDs of future unknown users who visit webpages, the prediction model configured to, for each candidate user ID, receive, as an input, the visit features and output a likelihood score indicating how likely the selected candidate user ID is an actual user ID of the unknown user.

16. The computer-implemented method of claim 15, wherein the training comprises supervised machine learning.

17. A computer-implemented method performed by an online system, the method comprising:

obtaining, from a first user device of a user when the user is provided with a content item, and in response to the user being presently logged into the online system on the first user device, a user ID of the user on the online system;

obtaining, from a second user device of the user in response to the user purchasing a product on a webpage when the user was not presently logged onto the online system on the second user device, visit data describing a visit of the second user device to a webpage, wherein the visit data comprises at least one of a universally unique identifier (UUID), media access control (MAC) address, or serial number of the user device;

identifying a plurality of candidate user identifiers (IDs) for the user based on the visit data;

for each candidate user ID, deriving visit features based on the candidate user ID and the visit data;

scoring each candidate user ID using a prediction model derived via machine learning from visit features, the prediction model configured to receive as an input, for each candidate user ID, the visit features and output a likelihood score indicating how likely the selected candidate user ID is an actual user ID of the unknown user;

selecting a candidate user ID for the user based on the scoring; and correlating the purchase of the product by the user on the second user device with the providing of the content item to the user, responsive to the selected candidate user ID matching the obtained user ID from the first user device.

18. The computer-implemented method of claim 17, wherein the prediction model was trained by a training process comprising:

receiving, by the online system from user devices, visit data describing visits of users via the user devices;

identifying a plurality of candidate user IDs based on the visit data;

for each of the candidate user IDs, deriving visit features based on the candidate user ID and the visit data;

generating a training set based on the derived visit features of the plurality of candidate user IDs, the training set comprising a positive set comprising visit features of candidate user IDs that matched user IDs explicitly specified by users during login; and training the prediction model based on the training set using supervised machine learning.

* * * * *